United States Patent [19]

Dardaris et al.

[11] Patent Number: 5,256,728
[45] Date of Patent: Oct. 26, 1993

[54] POLYCARBONATE-TITANIUM DIOXIDE COMPOSITIONS AND METHOD

[75] Inventors: David M. Dardaris, Ballston Spa; Gary R. Faler, Scotia; Patrick J. McCloskey, Watervliet, all of N.Y.

[73] Assignee: General Electric Company, Schenectady, N.Y.

[21] Appl. No.: 979,738

[22] Filed: Nov. 23, 1992

[51] Int. Cl.$^5$ ............................................. C08G 64/42
[52] U.S. Cl. ..................................... 524/611; 525/462
[58] Field of Search ....................... 524/611; 525/462

[56] References Cited

U.S. PATENT DOCUMENTS

| 4,357,271 | 11/1982 | Rosenquist | 524/611 |
| 4,661,555 | 4/1987 | Koga et al. | 524/611 |
| 4,772,655 | 9/1988 | Krishnan et al. | 524/611 |

OTHER PUBLICATIONS

U.S. patent application Ser. No. 07/968,946, filed Oct. 30, 1992.

*Primary Examiner*—Harold D. Anderson
*Attorney, Agent, or Firm*—William H. Pittman

[57] ABSTRACT

Pigmented polycarbonate compositions which are substantially stable with respect to molecular weight and melt viscosity are prepared by blending a redistributed polycarbonate with titanium dioxide free from polysiloxane coatings (i.e., "unpacified" titanium dioxide).

6 Claims, No Drawings

POLYCARBONATE-TITANIUM DIOXIDE COMPOSITIONS AND METHOD

This invention relates to the preparation of polycarbonate compositions, and more particularly to the preparation of pigmented compositions containing titanium dioxide.

Polycarbonates, as illustrated by those derived from 2,2-bis(4-hydroxyphenyl)propane (i.e., bisphenol A polycarbonates), are transparent resins having many desirable properties. For certain purposes, it is advantageous or necessary to employ them in opaque form, particularly with white pigmentation. This may be conveniently accomplished by blending the polycarbonate with titanium dioxide, a conventional white pigment.

A substantial proportion of commercially available polycarbonate is prepared interfacially, by the reaction of a suitable dihydroxyaromatic compound such as bisphenol A with phosgene under alkaline conditions in a mixed aqueous-organic medium, and in the presence of an amine such as triethylamine as catalyst. This method is commonly designated the "interfacial" method for preparing polycarbonate.

The pigmentation of interfacial polycarbonates by titanium dioxide generally results in molecular weight degradation. A degradation in the amount of 20-30% is often noted, but because of the unpredictable extent thereof it is impossible to ascertain reliably what the properties of the pigmented polycarbonate will be. This problem is typically overcome by coating the titanium dioxide, prior to its incorporation in the polycarbonate, with a relatively inert material such as a polysiloxane. Titanium dioxide thus coated is frequently designated "pacified titanium dioxide". The pacification method, while effective, is expensive. Therefore, it would be desirable to develop processing techniques which make pacification unnecessary.

In copending, commonly owned application Ser. No. 07/992,370, there is described a process for redistributing polycarbonates. This process comprises melt equilibrating the polycarbonate in the presence of a catalytic amount of a polycarbonate redistribution catalyst. The redistribution product is a polycarbonate of different and typically lower molecular weight than the unredistributed starting material.

It has now been discovered that the molecular weight and melt viscosity of redistributed polycarbonates remain essentially unchanged upon pigmentation with unpacified titanium dioxide and further processing. Thus redistributed polycarbonates can be employed in pigmented form without the processing uncertainties characteristic of interfacially prepared polycarbonates. This finding is the basis for the present invention.

Accordingly, the invention in one of its aspects is a method for preparing a pigmented polycarbonate composition which comprises:

melt equilibrating a linear or branched organic polycarbonate in the presence of a catalytic amount of a carbonate redistribution catalyst, to form a redistributed polycarbonate; and blending said redistributed polycarbonate with an amount effective for pigmentation of titanium dioxide free from polysiloxane coating.

The polycarbonates employed in the method of this invention typically comprise structural units of the formula

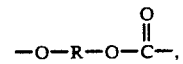

wherein R is a divalent organic radical.

Suitable R values in formula I include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

Preferably at least about 60% and more preferably at least about 80% of the total number of R values in the polycarbonate, and most desirably all of said $R^1$ values, are aromatic. The aromatic R radicals preferably have the formula

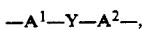

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gemalkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

Typically, the weight average molecular weight of the polycarbonate starting composition may range from values as low as 500 to values in excess of 100,000, as measured by gel permeation chromatography using polystyrene as the reference material. Preferably, the weight average molecular weight of the polycarbonate starting composition ranges from about 5,000 to about 100,000, more preferably, from about 25,000 to about 65,000.

Linear aromatic polycarbonates can be obtained commercially, for example, from General Electric Company as Lexan® brand 1020, 100, 105, 125, 135 and 145 polycarbonates. Alternatively, linear aromatic polycarbonates can be prepared by any of the usual procedures for making these materials, for example, by interfacial phosgenation of a dihydroxyaromatic compound or by interfacial polymerization of a mixture of aromatic oligomers, such as bischloroformates, monohydroxy monochloroformates, and/or bis-hydroxy-terminated polycarbonate oligomers, known to those skilled in the art.

Both linear and branched aromatic polycarbonates may be redistributed. Any of the commercially available branched aromatic polycarbonates may be used, such as those disclosed in U.S. Pat. Nos. 3,541,049; 3,799,953; 4,185,009; 4,469,861; and 4,431,793; all of which are incorporated by reference herein in their entirety.

Any of the above-identified polycarbonates having an initial weight average molecular weight typically in the range from about 5,000 to about 100,000 may be reformed into a final polycarbonate composition having a different molecular weight. Included are mixtures of different linear or branched polycarbonates and mixtures of linear and branched polycarbonates.

The redistribution process involves melt equilibrating the starting composition in the presence of a carbonate redistribution catalyst. Melt equilibration involves heating the polymer at a temperature sufficient to produce a melt for a time sufficient to achieve redistribution equilibrium. Typically, when the starting material is a single homopolymer or copolymer, redistribution converts the starting polycarbonate into a redistributed polycarbonate having a weight average molecular weight which is lower than the starting weight. When the starting composition is a blend of homopolymers or copolymers of different molecular weights, it is possible for the redistributed composition to have a molecular weight higher than at least one starting component and lower than at least one other starting component.

Suitable carbonate redistribution catalysts include a wide variety of bases and Lewis acids. Illustrative examples include amines, particularly 1,3-dimethylaminopropane, imidazole, benzimidazole, and benzotriazole, as well as other organic bases, for example tetraalkylammonium hydroxides, such as tetramethylammonium hydroxide, usually as the pentahydrate, and tetraethylammonium hydroxide; tetraalkylammonium phenoxides, such as tetramethylammonium phenoxide, usually as the monohydrate; tetraalkylammonium acetates, such as tetramethylammonium acetate; tetraalkylammonium tetraphenylborates, such as tetramethylammonium tetraphenylborate; as well as lithium stearate, the lithium salt of bisphenol A, the tetraethylammonium salt of bisphenol A, sodium phenoxide, and the like. Other suitable organic bases include phosphines, for example, triphenylphosphine. A wide variety of organometallics are suitable catalysts, including organotin compounds, such as di(n-butyl)tin oxide, di(n-octyl)tin oxide, di(n-butyl)tin dibutoxide, di(n-butyl)tin dioctoate, dibutyltin, tetrabutyltin, tributyltin trifluoroacetate, tributyltin chlorophenoxide, bis[(dibutyl)(phenoxy)tin] oxide, and tributyltin hydride; as well as organotitanium compounds, such as titanium tetra(isopropoxide), titanium tetra(5-methylheptoxide), and titanium tetra(butoxide); as well as, zirconium tetra(isopropoxide), aluminum tri(ethoxide), aluminum tri(phenoxide), mercuric acetate, lead acetate, (diphenyl)mercury, (tetraphenyl)lead, and (tetraphenyl)silane. Also suitable are a variety of hydrides, including sodium hydride, lithium hydride, aluminum hydride, boron trihydride, tantalum and niobium hydride, lithium aluminum hydride, lithium borohydride, sodium borohydride, tetramethylammonium borohydride, tetra(n-butylammonium) borohydride, lithium tri(t-butoxy) aluminum hydride, and diphenylsilane; as well as simple inorganics, such as lithium hydroxide, sodium silicate, sodium borate, silica, lithium fluoride, lithium chloride, lithium carbonate, and zinc oxide. Preferably, the catalyst is a tetraalkylammonium base, such as a tetraalkylammonium hydroxide, acetate, or phenoxide. More preferably, the catalyst is a tetraalkylammonium hydroxide, wherein each alkyl moiety contains from 1 to about 16 carbon atoms, more preferably, from 1 to about 10 carbon atoms, and most preferably, from 1 to about 4 carbon atoms.

The amount of carbonate redistribution catalyst employed may be any amount which is effective in promoting the redistribution process. Usually the effective amount will depend upon the particular catalyst employed, the reaction rate desired, the particular molecular weight desired in the redistributed composition, and to a lesser extent on the chemical nature of the particular starting polycarbonate composition. Depending upon such variables, an effective amount of catalyst can easily be determined without undue experimentation. It is preferred that when the catalyst is a tetraalkylammonium phenoxide, the amount of catalyst ranges from about 15 ppm. to about 1000 ppm. based upon the amount of starting polycarbonate. More preferably, the amount of such catalyst ranges from about 30 ppm to about 750 ppm.

Optionally, a diaryl carbonate may be added to the starting polycarbonate composition to be redistributed. The diaryl carbonate functions to control molecular weight and serves as an efficient endcapping agent. Diaryl carbonates which are suitable include diphenyl carbonate and substituted diphenyl carbonates provided that the substituent is inert with respect to the redistribution process. Typical inert substituents include alkyl, halo, cyano, alkoxy, carboxy, aryl and nitro moieties. Preferably, the diaryl carbonate is unsubstituted diphenyl carbonate.

The amount of diaryl carbonate employed may be any amount which provides the desired molecular weight in the redistributed polycarbonate composition. Usually, the amount of diaryl carbonate is no greater than about 1.5 weight percent based upon the amount of starting polycarbonate, preferably no greater than about 1.0 weight percent.

The redistribution process can be effected by dry mixing the starting organic polycarbonate, the carbonate redistribution catalyst, and optionally, the diaryl carbonate, and melt equilibrating the resulting mixture at a temperature ranging from about 180° C. to about 320° C. Preferably, the temperature ranges from about 250° C. to about 300° C. Typical melt processing techniques include melt condensation in a Helicone reactor for approximately 5 to 30 minutes, or continuous extrusion through a single screw or twin screw extrusion device. One skilled in the art will recognize that if extrusion is employed, the screw speed and feed rate may vary. During heating, it may be necessary to vent gases formed during decomposition of the carbonate redistribution catalyst.

Generally, the redistribution process is allowed to proceed to its thermodynamic end point, which is usually determined by one of two methods. In the first, the dispersivity, which is defined as the ratio of weight average molecular weight to number average molecular weight, is tracked with respect to time. Typically, the dispersivity decreases as the redistribution process progresses until at the apparent thermodynamic end point the dispersivity levels off.

A second method for determining the thermodynamic end point utilizes an observed shift in the distribution of low molecular weight oligomers. Polycarbonates prepared interfacially using tertiary amines as catalysts, regardless of the grade, have a weight ratio of cyclyc trimer to acyclic hexamer (hereinafter "T/H ratio") of approximately 1.0, reflecting the kinetic nature of the synthesis. As the redistribution of interfacially prepared polycarbonates progresses, the proportion of low molecular weight oligomer is reduced and that of cyclic hexamer decreases with respect to that of cyclic trimer, resulting in an increase in T/H ratio. The magnitude of the increase varies with the quantity of catalyst employed. Generally, increasing amounts of catalyst are proportional to increasing T/H ratio. As the process approaches thermodynamic equilibrium, the T/H ratio levels off typically at a number larger than 3.0. Accordingly, the T/H ratio may be employed not only to determine the thermodynamic endpoint of the redistribution process, but to determine a sample's process history, i.e., whether a sample has been prepared iterfacially or by the redistribution process described herein.

It is also possible to redistribute a mixture of high and low molecular weight polycarbonates to obtain a polycarbonate of intermediate molecular weight. The latter generally have narrower molecular weight distributions, as represented by dispersivity, and lower melt viscosities than simple blends of the high and low molecular weight resins. Mixtures of linear and branched resins may also be redistributed. finally, recycled polycarbonates, as illustrated by the linear optical disk grades and the branched blow molding grades, may be redistributed individually or in admixture; the products have the high ductility of the non-redistributed simple blends as well as other desirable properties.

The second step of the method of this invention is the blending of the redistributed polycarbonate with titanium dioxide. Any grade of titanium dioxide suitable for pigmentation is suitable for use. The essence of the invention is the employment of a titanium dioxide free from polysiloxane coating (i.e., "pacification"), since the invention is based on the finding that such a coating is unnecessary when the polycarbonate has been redistributed.

Blending of the polycarbonate and the titanium dioxide may be by any suitable art-recognized means, including dry blending and/or melt mixing (e.g., by extrusion). The amount of titanium dioxide employed is an amount effective for pigmentation, typically about 1–20% by weight based on polycarbonate.

The reasons why unpacified titanium dioxide may be employed in combination with redistributed polycarbonate are not fully understood. It is believed that the phenomenon is partly attributable to the activity of unpacified titanium dioxide as a redistribution catalyst for ordinary polycarbonate, such as interfacially prepared polymer. such redistribution would inherently cause a decrease in the molecular weight of interfacially prepared polycarbonate, but not of polycarbonate which has already been redistributed. However, activity as a redistribution catalyst cannot account for the entire molecular weight loss observed under all circumstances, or for the erratic magnitude of such loss.

In any event, pigmented polycarbonate compositions prepared by the method of this invention are substantially stable with respect to molecular weight and melt viscosity. Such compositions are another aspect of the invention. Their stability is pronouncedly superior to that of similar compositions in which interfacially prepared polycarbonate is employed.

The invention is illustrated by the following examples. Molecular weights are weight average and were determined by gel permeation chromatography relative to polystyrene.

EXAMPLE 1

A commercially available bisphenol A polycarbonate having a molecular weight of 65,000 was dried in a hot air oven at 115° C. for at least 4 hours and dry blended with 30 ppm. of tetramethylammonium hydroxide pentahydrate. The resulting blend was extruded in a twin screw extruder at 260° C. and 4.5–6.8 kg./hour, with vacuum venting. The product was a redistributed polycarbonate having a molecular weight of 49,800.

The polycarbonate was blended with 10% by weight, based on polycarbonate, of unpacified titanium dioxide which had been similarly dried. Blending was by dry mixing in a Henschel mixer, followed by extrusion under the above-described conditions.

The molecular weight of the pigmented product was compared with those of various controls, including unpigmented interfacially prepared polycarbonate, unpigmented but reextruded redistributed polycarbonate and interfacial polycarbonate pigmented with pacified and unpacified titanium dioxide. The molecular weight values are given in Table I.

TABLE I

|  | Polycarbonate mol. wt. | |
| --- | --- | --- |
|  | Interfacial | Redistributed |
| No $TiO_2$ | 50,000 | 49,800 |
| No $TiO_2$, reextruded | — | 48,600 |
| Unpacified $TiO_2$ | 38,700 | 44,700 |
| Pacified $TiO_2$ | 46,100 | 47,400 |

It is apparent from Table I that the molecular weight decrease of a redistributed polycarbonate pigmented with unpacified titanium dioxide is substantially less than that for interfacially prepared polycarbonate.

EXAMPLE 2

The procedure of Example 1 was repeated, employing 180 ppm. of tetramethylammonium hydroxide pentahydrate to produce a redistributed polycarbonate with a molecular weight of 35,300. The molecular weight results for the redistributed polycarbonate are given in Table II.

TABLE II

|  | Polycarbonate mol. wt. |
| --- | --- |
| No $TiO_2$ | 35,300 |
| No $TiO_2$, reextruded | 35,300 |
| Unpacified $TiO_2$ | 33,400 |

EXAMPLE 3

The redistributed polycarbonate of Example 1 and the corresponding interfacially prepared polycarbonate were each blended with 2% by weight of unpacified titanium dioxide, and molded into test parts. The melt flow index of the part made from redistributed polycarbonate was 9.6 grams/10 minutes, while that of the part made from interfacial polycarbonate was 12.0 grams/10 minutes. Other physical properties were comparable. Thus, the melt viscosity of the pigmented redistributed polycarbonate was substantially higher than that of the pigmented interfacial polycarbonate.

What is claimed is:

1. A method for preparing a pigmented polycarbonate composition which comprises:

melt equilibrating a linear or branched polycarbonate in the presence of a catalytic amount of a carbonate redistribution catalyst selected from the group consisting of bases and Lewis acids, to form a redistributed polycarbonate; and blending said redistributed polycarbonate with an amount effective for pigmentation of titanium dioxide free from polysiloxane coating.

2. A method according to claim 1 wherein the polycarbonate is an aromatic polycarbonate.

3. A method according to claim 2 wherein the polycarbonate comprises structural units of the formula:

$$-\text{O}-\text{R}-\text{O}-\overset{\overset{\text{O}}{\|}}{\text{C}}-, \quad (I)$$

wherein R has the formula:

$$-A^1-Y-A^2-, \quad (II)$$

each of $A^1$ and $A^2$ is a monocyclic divalent aromatic radical and Y is a bridging radical in which one or two carbon atoms separate $A^1$ and $A^2$.

4. A method according to claim 3 wherein the polycarbonate is a linear polycarbonate.

5. A method according to claim 4 wherein the polycarbonate is a bisphenol A polycarbonate.

6. A method according to claim 1 wherein the proportion of titanium dioxide is about 1-20% by weight based on polycarbonate.

* * * * *